Patented Oct. 8, 1935

2,016,634

UNITED STATES PATENT OFFICE 2,016,634

METHOD OF PRODUCING COFFEE FREE FROM CAFFEINE

Theodor Grethe, Hamburg, Germany

No Drawing. Application December 12, 1933, Serial No. 702,099. In the Netherlands November 13, 1933

5 Claims. (Cl. 99—11)

This invention relates to a method of producing coffee free from caffeine.

When producing coffee free from caffeine by extracting the latter from the raw coffee beans with the aid of a suitable caffeine solvent it is always a difficult task completely to remove the extraction agent from the beans and to free them from the peculiar foreign taste they have acquired during the treatment. This applies also to the method carried out with a mixture of acetic ester and a small amount of water.

To remove the residual solvent it has been proposed to steam out the treated coffee beans with pressure steam or dry pressure steam and, alternately, to expose them to the action of pressure steam in a vacuum. It is further known to let steam under 100° act in a centrifuge for one to two hours on the coffee beans previously extracted by means of acetic ether and then to dry centrifuge them for two hours at 40° to 50°.

Even if this action is continued for a long time, the solvent and foreign taste cannot be fully removed in this manner from coffee beans pretreated with acetic ester (ethyl acetate) and water. Complete elimination is possible, however, if, according to the invention, expanded steam having an approximate moisture content of 5% to 8% is permitted to act on the coffee beans for 13 to 15 hours, whereby the aroma of the coffee bean after roasting is not affected and no extractive matter is lost.

The treatment of the coffee beans during the step of steaming them with expanded wet steam is conducted so that the beans afterward have a water content approximating 35% of their weight. They are then dried to reduce moisture at least to the normal water content of about 10% by heating them first to a temperature of 40° to 45° centigrade, which after some time is increased to about 80° centigrade.

If such temperatures or still higher ones were applied from the start, the coffee beans might swell up and burst or color too much.

Even under this process, a darker color than that of the untreated beans cannot be avoided, though they may be made lighter in color and, simultaneously, may slightly increase their volume if, after passing through the steaming and drying steps, they are heated in their own gases and vapors for a short time, say half an hour, to temperatures ranging from over 80° to 135° centigrade and if care is taken that no fresh air is admitted and pressure cannot develop. This can be achieved for instance by using a ventilator for circulating the gases and vapors contained in the drying device without external air supply first through a piping and then blowing them back into the drier while they are heated in the piping in say half an hour up to 135° centigrade.

The method described is not limited in application to caffeine-free coffee obtained with the aid of a mixture of acetic ester and water, but, with equal success, may be used also for coffee beans treated with other extraction agents.

I claim:—

1. A method of producing coffee free from caffeine by supplementarily treating with steam coffee beans freed from caffeine by extraction, especially by means of a mixture of acetic ester and water, consisting in treating the coffee beans, after the separation of the extraction agent, with wet expanded steam containing 5% to 8% water for sufficient time to impart to the coffee beans a water content of 30% by weight.

2. A method of producing coffee free from caffeine by supplementarily treating with steam coffee beans freed from caffeine by extraction, especially by means of a mixture of acetic ester and water, consisting in treating the coffee beans, after the separation of the extraction agent, 13 to 15 hours with wet expanded steam containing 5 to 8% water.

3. A method of producing coffee free from caffeine by supplementarily treating with steam coffee beans freed from caffeine by extraction, especially by means of a mixture of acetic ester and water, consisting in treating the coffee beans, after the separation of the extraction agent, 13 to 15 hours with wet expanded steam to have them possess afterward a water content approximating 30% of their weight, drying them at a temperature ranging from 40° to 45° centigrade, and gradually increasing the temperature to 80° centigrade until the normal water content of about 10% is attained.

4. A method of producing coffee free from caffeine by supplementarily treating with steam coffee beans freed from caffeine by extraction, especially by means of a mixture of acetic ester and water, consisting in treating the coffee beans, after the separation of the extraction agent, with wet expanded steam, drying them at a temperature of 40° to 45° centigrade gradually rising up to 80° centigrade, and finally heating them in the gases and vapors of their own atmosphere for a short time to over 80° up to 135° centigrade.

5. A method of producing coffee free from caffeine by supplementarily treating with steam coffee beans freed from caffeine by extraction, especially by means of a mixture of acetic ester and water, consisting in treating the coffee beans, after the separation of the extraction agent, with wet expanded steam, drying them at a temperature of 40° to 45° centigrade gradually rising up to 80° centigrade, and finally heating them in the gases and vapors of their own atmosphere for about half an hour to over 80° and up to 135° centigrade.

THEODOR GRETHE.